Feb. 9, 1960 — H. REICH — 2,924,082
ELASTIC COUPLING
Filed Feb. 25, 1957 — 5 Sheets-Sheet 1

INVENTOR
Herwarth Reich
By Michael S. Striker
agt.

Feb. 9, 1960 H. REICH 2,924,082
ELASTIC COUPLING
Filed Feb. 25, 1957 5 Sheets-Sheet 2

INVENTOR
Herwarth Reich
BY Michael S. Striker

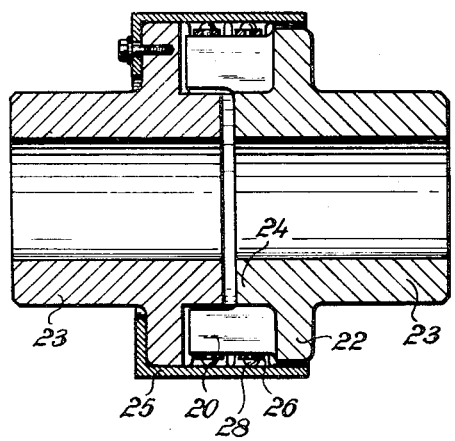
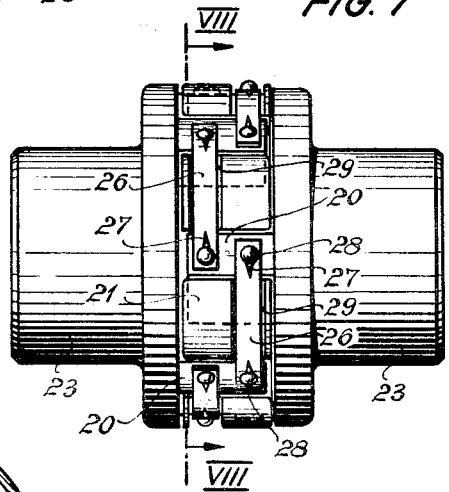
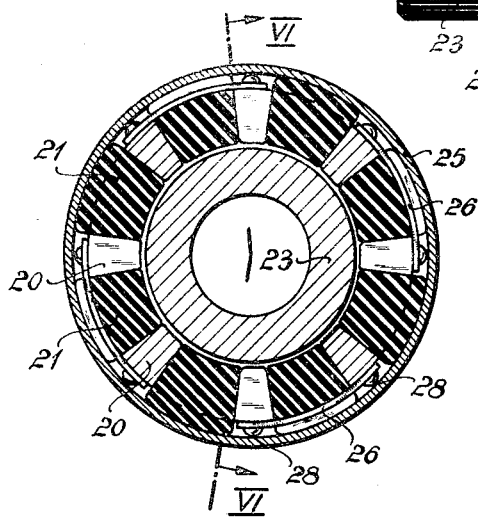

United States Patent Office 2,924,082
Patented Feb. 9, 1960

2,924,082

ELASTIC COUPLING

Herwarth Reich, Bochum, Germany

Application February 25, 1957, Serial No. 642,253

Claims priority, application Germany February 23, 1956

15 Claims. (Cl. 64—13)

The invention relates to couplings in which elastic intermediate members are introduced in the flux of force, which members enable a mutually radial, axial and angular displacement of the interconnected shafts and have a torsional vibration damping effect. Couplings with intermediate members of rubber or similar elastic synthetic material are particularly suitable for this purpose and numerous couplings of this type are known. In the construction, especially of couplings with intermediate members made from rubber or some similar elastic material, particular attention is attached to the intermediate members being easy to exchange. To meet this requirement couplings have been built wherein the elastic intermediate members (spiders, spring banks, rubber drifts or rubber bolts) are inserted in radial recesses in the coupling halves and held therein by sleeves slipped over the coupling halves. The intermediate members are then seated with half their length in each half of the coupling. In transmitting the torque the intermediate members are bent in substantially S-shape with correspondingly heavy pressure at the bending edges. However, in the event of angular and radial displacement of the shafts to be connected, the distance of the opposite points of the coupling halves changes continually as the coupling rotates. The intermediate members can scarcely follow such changes in distance precisely on account of the high pressure occurring on the bending edges, so that the intermediate members are subjected to abrasion and overstressing resulting in premature wear.

To counteract this objection a coupling has already become known in which the intermediate members are positively embedded in radial grooves in the coupling halves. As the coupling rotates, the continual changing of the distance of the opposite points of the two coupling halves is compensated in the sections of the intermediate members connecting the clamped points, which for this purpose are provided with curved or corrugated cross-section. Such couplings have in fact given good satisfaction. But as the portions of the intermediate members provided with curved or corrugated cross-section must have a relatively large length of curve, in order to be capable of stretching to the necessary degree, the couplings are excessively yieldable for some purposes of use.

In spite of other serious objections couplings are chosen for these purposes of use which are constructed like claw couplings and the claws of the two coupling halves act one on the other by means of elastic intermediate members, for example even thick rubber packs fitted between the halves. In the case of couplings constructed in this manner the edge pressures which occur are not so heavy and the intermediate members can by deformation under tangential stress easily compensate the mutual movements of the claws of the two coupling halves caused by the angular or radial displacement of the two shafts to be connected. The intermediate members of such couplings can, however, only be exchanged when the coupling halves are axially moved apart. This constitutes an objection to this type of coupling which cannot be underestimated and which in many cases entirely excludes the use of coupling.

The object of the invention is to produce a coupling, the intermediate members of which can be easily and quickly exchanged, yet are so arranged that the engagement of force is not restricted to their elastic deformation, although the coupling even in the case of relatively slight mutual displacement of the coupling halves is capable of transmitting large torques and to compensate to an extent sufficient to meet practical requirements the displacements of the shafts to be interconnected.

According to the invention a coupling is proposed which possesses in combination the following features known per se.

(1) The intermediate members made from elastic material and introduced in the flux of force are placed in radial recesses in the coupling halves.

(2) The elastic intermediate members are held in the radial recesses in the coupling halves by sleeves slipped over the coupling halves.

(3) The coupling is constructed like a claw-coupling, an elastic intermediate member being arranged between each claw of one coupling half and a claw of the other coupling half.

Such a coupling takes fully into consideration all the above-mentioned conditions. The coupling built on the principle of the invention can be adapted for a large variety of uses. Some of the other features of the invention are set forth in the description of several forms of construction.

It is, however, mentioned in particular that under certain circumstances it is advisable to construct the claws as bolts, whereby by the selection of the ratio between the bolt diameter in the case of a certain number of bolts and the pitch circle of the bolts, it is possible to enable the coupling halves to be brought out of engagement by radially shifting the coupling halves.

In further developing this idea it is provided according to another feature of the invention to arrange between the two coupling halves a disc which carries bolts on both sides, the row of bolts on one side being in engagement with the row of bolts of one coupling half, whereas the bolts on the other side of the disc are in engagement with the row of bolts in the other coupling half. This disc can then be fitted radially so that the coupling can be disengaged without it being necessary to remove one of the coupling halves with the drive mechanism to which it is coordinated.

The coupling according to the invention can easily be constructed as a coupling to be switched into idle motion if, as is known, a ring carrying the claws of one coupling half is non-rotatable but axially shiftable on the hub of this coupling half.

The coupling is likewise suitable as a so-called flange coupling for connecting a shaft with a disc-shaped machine element, for which purpose a ring provided with claws is flanged on to the disc-shaped machine element.

In the drawings:

Figs. 6 to 8 show yet another form of construction of the invention, in Fig. 6 in axial section, Fig. 7 side elevation, and Fig. 8 in a section in a radial plane;

Fig. 9 being an axial section of the coupling in engaged position, Fig. 10 a similar view in disengaged position, and Fig. 11 a section in a radial plane;

Figure 1:
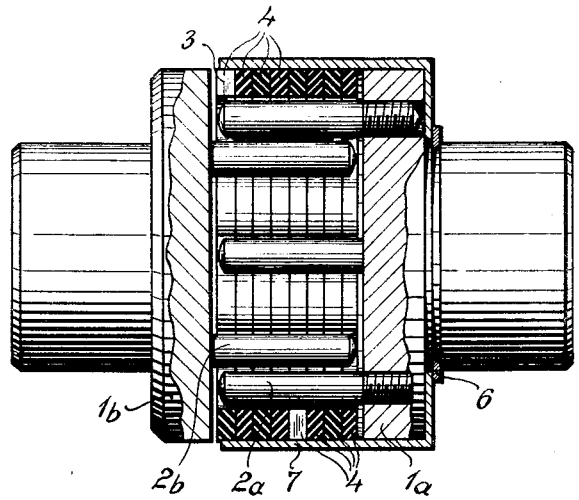
Figs. 1 to 3 show one form of construction of the invention, Fig. 1 being an axial section, Fig. 2 a side elevation, and Fig. 3 a section in a radial plane.
Figure 2:
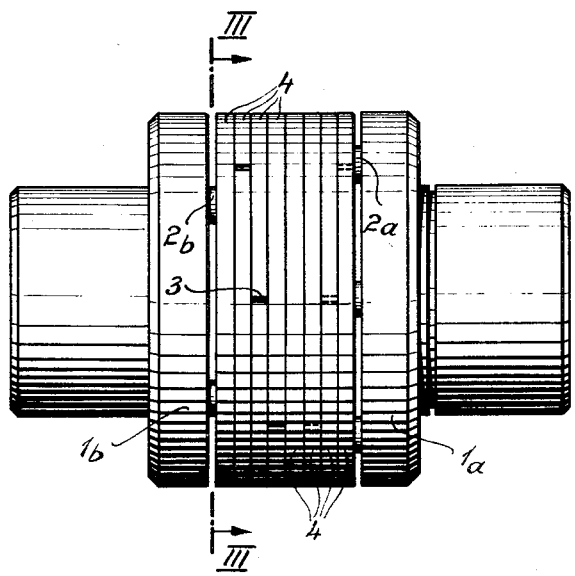
Figure 3:
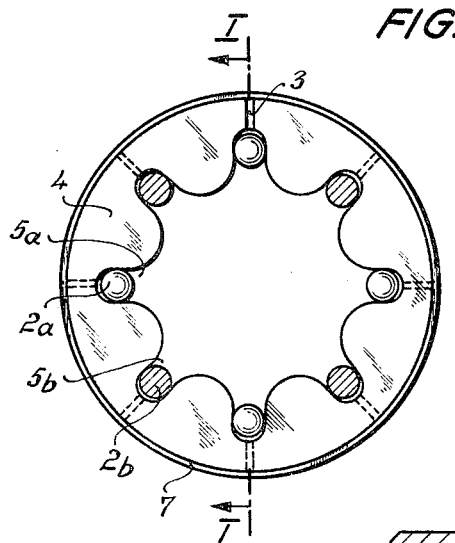

In the example illustrated in Figs. 1 to 3 the coupling halves are designated by 1a and 1b. Each coupling half 1a and 1b carries a number of bolts 2a and 2b respectively, inserted parallel to the axis of the coupling halves. Around the bolts 2a and 2b of the coupling halves 1a and 1b which are mutually displaced by half a bolt pitch, a series of rings 4 of rubber or similar elastic material and provided with inner teeth and radial slits 3 is placed, so that the bolts 2a of the coupling half 1a engage the tooth gaps 5a of the internally toothed rings 4 which are located between the tooth gaps 5b in which the bolts 2a of the other coupling half 1b engage. The rings 4 can be mounted so that their slits 3 are mutually displaced as shown in Fig. 3. The slit rings 4 are held by a sleeve 7 slipped over them and by means of a snap ring 6 on the coupling half 1a. A characteristic feature of the form of construction of the coupling illustrated in Figs. 1 to 3 is the selection of the ratio between the diameter, the number of bolts and the pitch circle diameter of the row of bolts, which are adapted to each other so that the bolts 2a and 2b of both coupling halves 1a and 1b can be brought out of engagement by mutual radial displacement of the coupling halves. This can easily be attained if the diameter $d$ of the bolts is equal to or smaller than $$\frac{D}{2}\left(1-\cos\frac{360}{2n}\right)$$

wherein $D$ is the pitch circle diameter of the row of bolts, and $n$ the number of the bolts provided on one coupling half.

Figure 4:
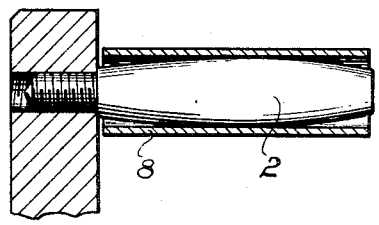
Fig. 4 shows a detail.

In Fig. 4 details of a possible application of the coupling illustrated in Figs. 1 to 3 are shown. In accordance therewith sleeves 8 are slipped on the bolts 2 and axially shiftable thereon. Consequently, the intermediate members are positively prevented from axially sliding on the bolts in the event of angular displacement of the shafts to be connected. If the bolts are also made in barrel-shape as shown in Fig. 4, the sleeves 8 are capable of carrying out a tumbler movement in relation to the bolts and can therefore adapt themselves according to angular displacement of the shafts to be coupled and consequently compensate this displacement. The elastic intermediate members then only have to provide for the rotary elasticity of the coupling.

Figure 5:
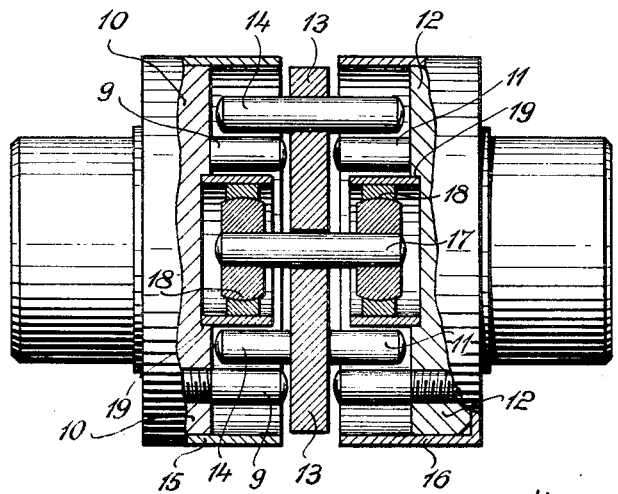
Fig. 5 shows another form of construction in axial section.

A modification of the coupling illustrated in Figs. 1 to 3 is shown in Fig. 5. In this case a disc 13 is introduced into the rows of bolts on the coupling half 10 and the bolts 11 on the coupling half 12, which are not in engagement with each other, the disc 13 being provided with bolts 14 projecting on each side. The bolts 14 engage on the one side between the bolts 9 and on the other side between the bolts 11, so that by interposing the elastic intermediate members transmission of force takes place from the coupling half 10 to the coupling half 12. When the sleeves 15 and 16 holding the intermediate members and the intermediate members themselves are removed, the disc 13 can be fitted in this coupling without it being necessary to move apart the shafts to be coupled. The coupling can be completely dismantled so that the two coupling halves can be turned relatively to each other as desired. If necessary the disc 13 can also be fixed in relation to the coupling halves 10 and 12. For this purpose an axle 17 is fitted centrally in the disc 13 and in turn rests axially slidable in ball pivot bearings 18. The ball pivot bearings 18 are fitted in centering means 19 in the coupling halves 10 and 12 and held therein in a suitable manner. If necessary, the disc 13 can also be ball pivoted on the axle 17 Of course, insofar as coupling member 10 is concerned, the member 13 forms a second coupling member cooperating therewith in a manner very similar to the cooperation of coupling members 1a and 1b with each other in the embodiment of Figs. 1–3, and the same is true of the relation between coupling member 12 and the member 13.

The coupling according to the form of construction illustrated in Figs. 6 to 8 is provided with claws 20 between which the substantially wedge-shaped intermediate members 21 are arranged. The claws 20 are formed on the one side on the disc-shaped part 22 of the coupling halves 23 and for the purpose of reinforcement extend for about half their axial length along the hub part 24 of the coupling halves 23. In order to prevent the intermediate members 21 from falling out while the coupling is being assembled, that is before the sleeve 25 is slipped over the intermediate members 21, clamping bands 26 are provided in this form of construction. These clamping bands 26 are provided with slits 27 at their ends and slipped on to notched pins 28 fitted in the claws. The intermediate members 21 are provided with recesses 29 for receiving the clamping bands. Instead of using clamping bands flaps can also be formed on the intermediate members.

Figure 9:
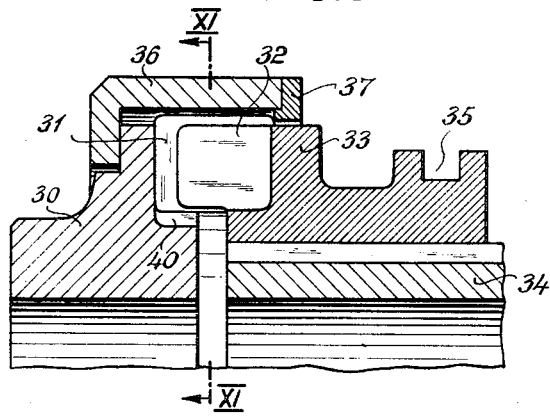
Figs. 9 to 11 show the coupling in the form of a shifting coupling.
Figure 10:
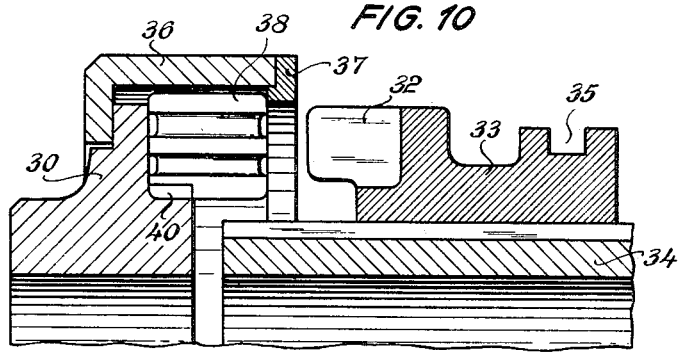
Figure 11:
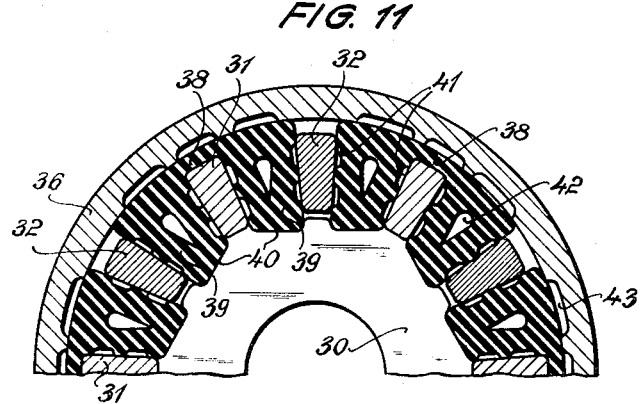

The coupling illustrated in Figs. 9 to 11 is constructed as a shifting coupling. The coupling half 30 is provided with claws 31. Claws 32 of the other coupling half are formed on a ring 33 which is mounted on the hub 34 so that it is secured against rotation yet axially shiftable thereon. A striker fork (not shown) engaging in the annular groove 35 can be used in known manner for shifting the ring 33. In this coupling care must be taken that the intermediate members are not axially shifted when disengaging the coupling. For this purpose a ring 37 is flanged on the sleeve 36 holding the intermediate members in outward direction, which ring also locks the intermediate members in axial direction. Furthermore it must be seen that the intermediate members cannot enter the space necessary for receiving the engageable and disengageable claws 32 and thus prevent the engagement of the claws. According to the form of construction illustrated the intermediate members 38 are made saddle-shaped and its arms 39 covering the flanks of the claws 31 fitting in corresponding recesses 40 in the hub of the coupling half 30.

To prevent elastic deformation of the intermediate members under load, the intermediate members can, as shown in Figs. 9 to 11, be provided with recesses 41 on their bearing surfaces directed towards the claws or also towards the sleeve. For this purpose the intermediate members are, however, also provided with cavities 42 or with spaces filled with very elastic material. Similarly the sleeve may be provided with internal recesses 43 (see Fig. 11). As for certain assemblies the coupling may be required to take up elastically also axial forces, the intermediate elements may in such cases also be provided on their axial end faces with recesses or projections which ensure elastic deformation of the intermediate members also in axial direction.

If the intermediate members which are provided with recesses or projections on their bearing surfaces or with spaces, are otherwise enclosed almost completely between the claws, the coupling halves and the sleeve, the intermediate members are capable of restricted deformation, that is the coupling possesses a limited rotary elasticity without the parts of the coupling halves having metal contact. Such a characteristic is required in various cases where a coupling is fitted.

Figure 12:
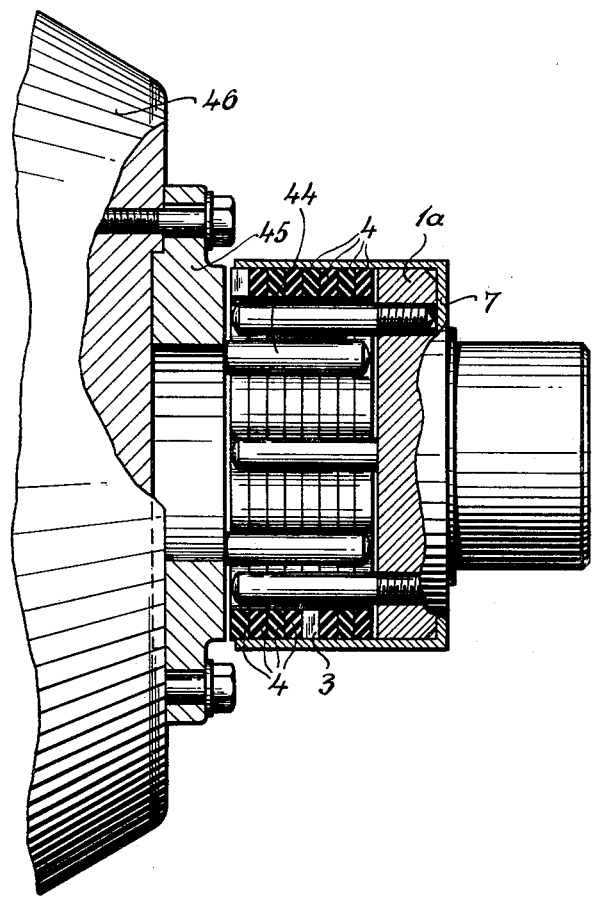
Fig. 12 shows in axial section the coupling according to the invention constructed as a flange coupling.

Another modification of the coupling is shown in Fig. 12 where it is constructed as a flange coupling. In this coupling, the actual construction of which corresponds to that shown in Figs. 1 to 3, a flange 45 carrying a series of bolts 44 is provided instead of one of the coupling halves, whereby this flange can be formed on any kind of disc-shaped machine element 46.

It is also mentioned that it may be advantageous under certain circumstances in the case of the couplings described for the sleeves (7, 15, 16, 25 or 36) holding the intermediate members between the claws to be made from very strong yet elastic synthetic material. For this purpose polyester resins or polyamides reinforced with glass fibres come into question.

I claim:

1. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members; and yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member.

2. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; a plurality of compressible elastic motion transmitting members distributed along said circle and respectively located in the spaces between and in engagement with said projections so that said motion transmitting members are subject only to compression when transmitting rotation between said coupling members during turning thereof about their common axis; and yieldable elastic connecting means extending through less than 360° around said axis and permanently fixed with said motion transmitting members for maintaining the same in engagement with the projections of one of said coupling members when the other coupling member is displaced axially away from said one coupling member, said connecting means being resiliently deformable for rendering said motion transmitting members removable together with said connecting means from the spaces between the projections of said first and second coupling members without axial displacement of one coupling member with respect to the other.

3. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; a plurality of compressible elastic motion transmitting members distributed along said circle and respectively located in the spaces between and in engagement with said projections so that said motion transmitting members are subject only to compression when transmitting rotation between said coupling members during turning thereof about their common axis; and yieldable elastic connecting means extending through less than 360° around said axis and permanently fixed with said motion transmitting members for maintaining the same in engagement with the projections of one of said coupling members when the other coupling member is displaced axially away from said one coupling member, said connecting means being resiliently deformable for rendering said motion transmitting members removable together with said connecting means from the spaces between the projections of said first and second coupling members without axial displacement of one coupling member with respect to the other, said connecting means being located further from the common axis of said coupling members than said projections.

4. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; a plurality of compressible elastic motion transmitting members distributed along said circle and respectively located in the spaces between and in engagement with said projections so that said motion transmitting members are subject only to compression when transmitting rotation between said coupling members during turning thereof about their common axis; a plurality of elastic yieldable connecting means permanently connected with every other one of the series of motion transmitting members distributed about said axis and each connecting means being permanently connected with the next following motion transmitting member so that said plurality of connecting means interconnect said motion transmitting members in pairs, said plurality of connecting means maintaining said motion transmitting members in engagement with the projections of one coupling member when the other coupling member is axially displaced from said one coupling member and said plurality of connecting means being elastically deformable for rendering said pairs of motion transmitting members radially removable from the spaces between said projections without axial displacement of said coupling members one with respect to the other.

5. A coupling arrangement comprising, in combination, a first coupling member having a predetermined axis and having a plurality of axially extending projections circumferentially spaced from each other and distributed about said axis along a predetermined circle whose center is in said axis, said first coupling member being formed along a circle concentric with said first-mentioned circle and of a smaller diameter than the same with a pair of recesses directed away from said axis; a second coupling member coaxial with said first coupling member and having a plurality of axial projections also circumferentially spaced from each other and distributed about said axis along said circle, the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members, said motion transmitting members respectively extending into said recesses; and yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member.

6. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members; yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member; and an annular member surrounding said projections and motion transmitting members during operation of the coupling, said annular member being axially displaceable to free said motion transmitting members for movement radially out of the spaces they occupy.

7. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; and a plurality of yieldable elastic rings each extending through almost 360° and each having a pair of free ends located adjacent each other and defining a gap between themselves, said rings being located one next to the other along the common axis of said coupling members and surrounding said projections of said coupling members and each ring having a plurality of teeth extending radially from its inner periphery toward said axis respectively through the spaces between the projections of said coupling members, the teeth of each ring engaging said projections, and the gaps of said rings being angularly displaced with respect to each other about said axis.

8. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling member is transmitted between said coupling members through said motion transmitting members, said motion transmitting members being hollow; and yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member.

9. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members, said motion transmitting members having projection-engaging surfaces formed with cutouts; and yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member.

10. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members; yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member; and an axially displaceable annular member surrounding said projections and having an inner surface engaging said motion transmitting members and connecting means and formed with cutouts, said annular member being axially displaceable to free said motion transmitting members for movement together with said connecting means away from said axis.

11. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member, the projections of said first coupling member being located out of the path of movement of the projections of said second coupling member when the latter is radially displaced with respect to said first coupling member so that said coupling members may be separated by radial movement of one coupling member with respect to the other; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members; and yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member.

12. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members; yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member; and an elongated tubular sleeve receiving in its interior at last one of the projections located next to one of said motion transmitting members, said sleeve having an inner surface directed toward an outer surface of said one projection which extends into said sleeve, and at least one of said surfaces being convexly curved in an axial direction so that said sleeve is tiltable with respect to said one projection.

13. A coupling arrangement comprising, in combination, a first coupling member having a predetermined axis and having a plurality of axially extending projections circumferentially spaced from each other and distributed about said axis along a predetermined circle whose center is in said axis; a second coupling member coaxial with said first coupling member and having a plurality of axial projections also circumferentially spaced from each other and distributed about said axis along said circle, the projections of said second coupling member being located with substantial clearance between the projections of said first coupling member, one of said coupling members including a ring constrained to turn with said one coupling member but axially shiftable with respect thereto and fixedly carrying the projections of said one coupling member so that said projections of said one coupling member are axially displaceable from the projections of the other coupling member; at least two compressible elastic motion transmitting members located at opposite sides of and engaging one projection of one of said coupling members and respectively engaging the pair of projections of the other coupling member between which said one projection is located, said motion transmitting members being subject only to compression when turning movement about the common axis of said coupling members is transmitted between said coupling members through said motion transmitting members; and yieldable elastic connecting means capable of yieldably retaining a given shape, permanently connected with both of said motion transmitting members for permanently interconnecting the same with each other through said connecting means, extending through less than 360° about said axis, and maintaining said motion transmitting members in engagement with said one projection when said connecting means has said given shape, so that if said other coupling member is axially displaced away from said one coupling member said motion transmitting members will be maintained in engagement with said one projection and so that said connecting means may be yieldably deformed to a shape different from said given shape for removing said motion transmitting members radially away from said one projection without axial displacement of said other coupling member away from said one coupling member.

14. In a drive transmitting device, a coupling member having a predetermined axis; a plurality of hollow tubular sleeves extending parallel to said axis and distributed circumferentially thereabout along a given circle whose center is in said axis; and means fixedly connected with said coupling member and connecting said sleeves to said coupling member for rotation therewith while freeing each sleeve for limited tilting movement in all directions with respect to its axis, so that when said sleeves are engaged by an elastic yieldable motion transmitting means said sleeves will automatically tilt during deformation of said motion transmitting means to have at all times a large area of contact therewith.

15. In a coupling arrangement, in combination, a first coupling member having a predetermined axis and having a plurality of axially extending projections circumferentially spaced from each other and distributed about said axis along a predetermined circle whose center is in said axis; and a second coupling member coaxial with said first coupling member and having a plurality of axial projections also circumferentially spaced from each other and distributed about said axis along said circle, the projections of said second coupling member being located with substantial clearance between the projections of said first coupling member, the projections of one of said coupling members being located out of the path of movement of the projections of the other coupling member when the latter coupling member is radially displaced with respect to said one coupling member so that said coupling members may be separated from each other by radial displacement of said coupling members one with respect to the other.

References Cited in the file of this patent
UNITED STATES PATENTS

| | | |
|---|---|---|
| 1,482,097 | Smith | Jan. 29, 1924 |
| 2,034,002 | Ricefield | Mar. 17, 1936 |
| 2,301,659 | Ricefield | Nov. 10, 1942 |
| 2,343,839 | Austin | Mar. 7, 1944 |
| 2,740,271 | Beler | Apr. 3, 1956 |
| 2,754,667 | Boschi | July 17, 1956 |

FOREIGN PATENTS

| | | |
|---|---|---|
| 839,967 | France | Jan. 7, 1939 |